SWITCHING APPARATUS FOR SELECTIVELY COUPLING A PREDETERMINED NUMBER OF MICROWAVE DEVICES BETWEEN AN INPUT AND AN OUTPUT PORT

Filed April 14, 1966 2 Sheets-Sheet 1

Harold A. Rosen,
Neal C. Silence,
INVENTOR.
BY.
[signature]
ATTORNEY.

SWITCHING APPARATUS FOR SELECTIVELY COUPLING A PREDETERMINED NUMBER OF MICROWAVE DEVICES BETWEEN AN INPUT AND AN OUTPUT PORT

Filed April 14, 1966 2 Sheets-Sheet 2

Harold A. Rosen,
Neal C. Silence,
INVENTORS.
BY.

Don O. Dennison

ATTORNEY.

United States Patent Office 3,403,357
Patented Sept. 24, 1968

3,403,357
SWITCHING APPARATUS FOR SELECTIVELY COUPLING A PREDETERMINED NUMBER OF MICROWAVE DEVICES BETWEEN AN INPUT AND AN OUTPUT PORT

Harold A. Rosen, Santa Monica, and Neal C. Silence, Torrance, Calif., assignors to Hughes Aircraft Company, Culver City, Calif., a corporation of Delaware
Filed Apr. 14, 1966, Ser. No. 542,579
4 Claims. (Cl. 333—24)

ABSTRACT OF THE DISCLOSURE

Microwave circuit arrangements capable of selectively coupling a number of similar microwave transmission paths in parallel are disclosed. Selective coupling is accomplished by a combination of multifunction microwave switches disposed in the output of the transmission paths to be coupled. Each switch utilizes an element of Faraday-effect material. By providing a magnetic biasing field through the element in the proper direction and magnitude the switch can be made to transmit either one or the other or both outputs from two transmission paths. By arranging a plurality of such switches in the manner of a relay tree any combination of one or more outputs from a plurality of transmission paths can be selected.

This invention relates to electromagnetic wave transmission devices and more specifically to microwave switches of a magnetically-controllable Faraday-effect type.

Frequently, it is desired to utilize a plurality of parallel-connected microwave devices, such as amplifiers, to obtain increased power handling capabilities. It may also be desirable in such applications to provide selective coupling means for switching individual devices in or out of the parallel combination. This is especially so in applications wherein it is necessary to provide a degree of redundancy, such as in inaccessible systems where a spare device is to be switched into the combination to replace a device which has become inoperative.

One method of coupling such devices so that they may be selectively inserted into or withdrawn from the combination is by the use of electro-mechanical microwave switches. Electro-mechanical switches, however, are subject to many drawbacks which can limit their usefulness in some applications. For example, in applications where size, weight, and high-reliability are important factors, it may not be practicable to utilize electro-mechanical microwave switching devices.

Another method of coupling a plurality of separate microwave devices to obtain increased power handling capability is to utilize a plurality of hybrid networks in the output paths of the devices. By properly interconnecting a plurality of microwave devices by means of hybrid networks their outputs can be combined. If the output signal from one of the devices decreases, such as by malfunction of the device, however, the device cannot be switched out of the circuit and replaced by an auxiliary device. Furthermore, due to the inherent characteristics of the hybrid networks, power from the devices which remain operative may also be lost due to the resultant hybrid network imbalance.

It is therefore an object of the present invention to provide a multifunction electronic microwave switch capable of selectively switching between or additively combining at least two input signals.

It is another object of the present invention to provide means for selectively coupling individual microwave devices in and out of a microwave circuit.

It is yet another object of the present invention to provide a microwave device capable of selectively coupling the outputs of a plurality of microwave devices.

In accordance with the principles of the present invention, the above objects are accomplished in a microwave circuit utilizing a plurality of microwave signal wave transmission paths, each including a similar microwave device by utilizing, at the outputs of such paths, a multifunction electronically-controlled switch. In a preferred embodiment the inputs of all of the individual microwave paths are arranged in a parallel manner with wave energy being applied thereto by suitable power-dividing means. The outputs of pairs of paths are connected as inputs to multifunction switches arranged somewhat in the manner of a switching or relay "tree." That is, the outputs of two paths are applied as two separate inputs to a first multifunction switch; the outputs of the next two paths are applied as separate inputs to a second multifunction switch and so on. Each of these switches has the capability of transmitting either of the inputs separately or the combined inputs simultaneously to its output port. The output ports of the multifunction switches of the first set mentioned above are, in turn, coupled as pairs of inputs to additional multifunction switches having the characteristics mentioned.

In accordance with the invention each of the multifunction microwave switches utilizes a hollow conductively bounded waveguide section containing an element of Faraday-effect material. The waveguide section is provided with two input ports disposed at a first end region and at least one output port disposed at the opposite end region. Phase-coherent electromagnetic wave energy from the microwave devices to be coupled, or from other switches, is applied to each of the input ports. The incoming wave energy is then propagated through the waveguide section in two independent plane polarized modes. By properly adjusting the magnitude and sense of a longitudinal magnetic biasing field in the Faraday-effect material, the plane of polarization of the wave energy is rotated so that either one of the input waves or the vector sum of both input waves is coupled out of the output port.

The above-mentioned and other features and objects of this invention will become more apparent by reference to the following description taken in conjunction with the accompanying drawings, in which.

Figure 1:
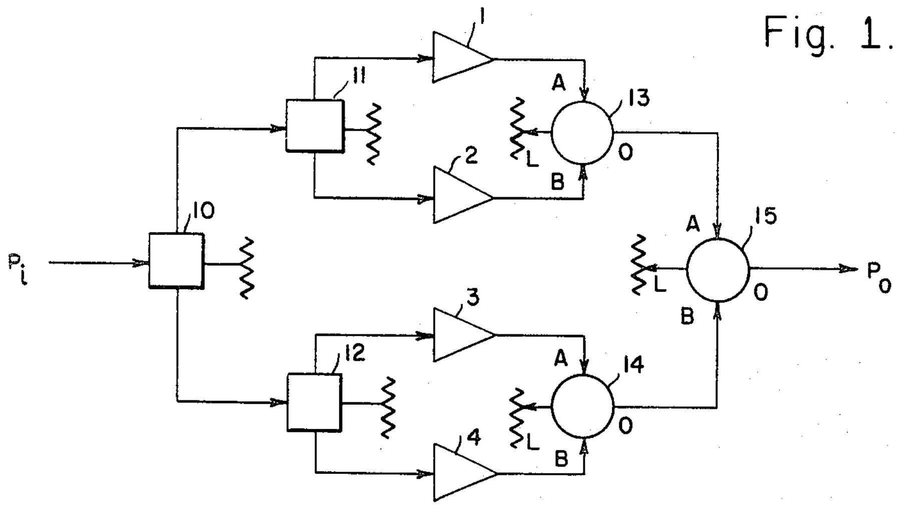
FIG. 1 is a block diagram of an illustrative circuit arrangement in accordance with the present invention.

Referring more specifically to the drawings, FIG. 1 is a block diagram of a circuit included for the purpose of indicating a preferred application of the multifunction microwave switch of the present invention. The circuit of FIG. 1 includes four microwave amplifiers 1, 2, 3 and 4 having their inputs connected in parallel. The input means to the amplifiers comprise power-dividing hybrid networks 10, 11 and 12, which, as connected, divide the input wave energy $P_i$ four ways. The input wave energy is thus applied in phase and at substantially equal magnitudes to the input of each of the four amplifiers.

In the past, if it was desired to combine the amplified wave energy from the output of amplifiers 1, 2, 3 and 4, another combination of three hybrid networks was employed. As mentioned hereinabove, however, such an approach requires that all four amplifiers be operative simultaneously. If one amplifier malfunctions, then the hybrid network to which its output is connected would become unbalanced. The result would be not only a decrease in the output power due to the failure of the malfunctioning amplifier, but, in addition, loss of power from the remaining amplifiers due to hybrid unbalance.

Figure 2:
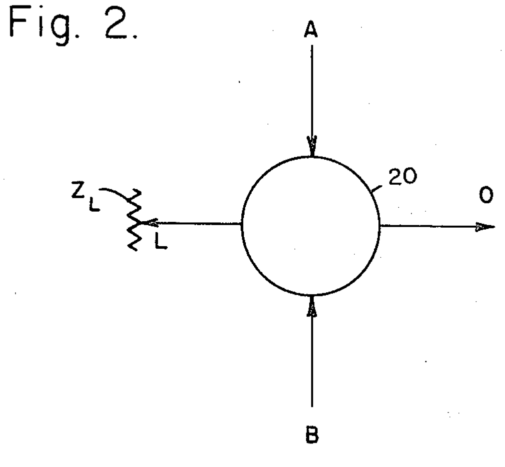
FIG. 2 is a block diagram of one of the multi-function microwave switches shown in FIG. 1 included for the purpose of indicating the characteristics thereof.

In the present invention, the outputs of the several amplifiers are combined by means of multifunction microwave switches 13, 14 and 15, each of which having the characteristics indicated in FIG. 2. In FIG. 2 one such switch 20, which corresponds to switch 13, 14 or 15, is illustrated in block diagram form. Switch 20 is provided with two input ports designated A and B, an output port O and preferably, a fourth port L which is terminated by a substantially reflectionless load impedance designated $Z_L$. The characteristics of switch 20 are such that, depending upon its mode or state, the output port O is effectively connected to either input port A, input port B or to both ports A and B simultaneously. By utilizing such a switch in the parallel amplifier circuit of FIG. 1, it is possible to obtain an output signal from a single amplifier or from the parallel combination of two, three or four amplifiers.

Returning now to the operation of the microwave circuit of FIG. 1, assume that, as mentioned above, it is desired to utilize three of the amplifiers, for example amplifiers 1, 2 and 3, in parallel and to utilize the remaining amplifier 4 as a spare. This is accomplished by maintaining switch 13 in the state wherein both its input ports A and B are simultaneously coupled to its output port O; switch 14 in the state wherein only its input port A is coupled to its output port O; and switch 15 in the state wherein both its input ports A and B are coupled to its output port O. When so operated, the input wave energy $P_i$ to the circuit is divided at hybrid network 10 and coupled to hybrid networks 11 and 12 where it is again divided. Thus, if the power is divided equally in each of the hybrid networks, as is generally the case, the input power to each of the amplifiers will be $P_i/4$. And assuming that the power amplification factor for all of the amplifiers is substantially the same and designated K, then the output power $P_o$ for the circuit will be $3KP_i/4$.

If it is now assumed that amplifier 3 malfunctions, it is possible to replace amplifier 3 by spare amplifier 4. This is accomplished simply by switching switch 14 to the state wherein its output is coupled to amplifier 4 rather than amplifier 3; that is, by changing the operating state of switch 14 so that its input port B rather than port A is coupled to its output port O. In this manner the malfunctioning amplifier is replaced by the spare amplifier with no decrease in circuit output power. It is clear, of course, that this description of operation is merely illustrative and that many other modes of operation are possible in the embodiment of FIG. 1. Furthermore, it is apparent that a greater or lesser number of amplifiers or other microwave transmission devices can be employed, with a correspondingly greater or lesser number of multifunction microwave switches.

Figure 3:
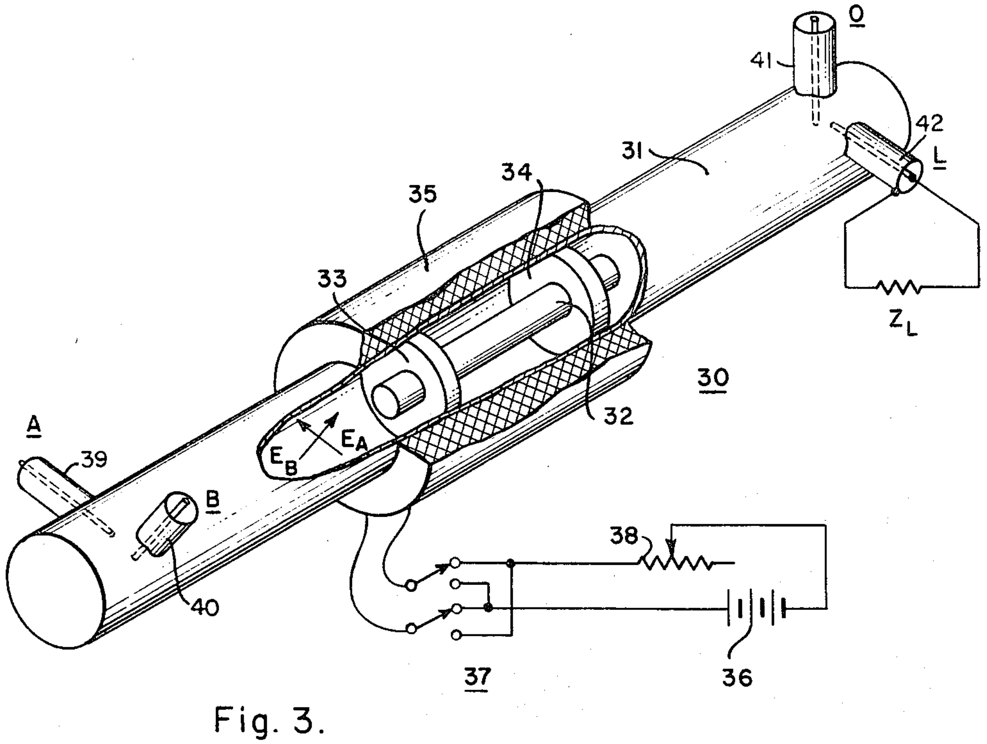
FIG. 3 is a pictorial view, partially broken away, of a multifunction microwave switch in accordance with the present invention.

In FIG. 3 there is shown, in a partially broken away pictorial view, a multifunction microwave switch 30 in accordance with the present invention. Switch 30 comprises a section 31 of conductively bounded waveguide having a substantially circular cross-section. The cross-sectional dimension of waveguide section 31 is preferably chosen so that at the frequency of intended operation only plane polarized wave energy in the dominant $TE_{11}$ mode will propagate therein. Coaxially disposed within waveguide section 31 is an elongated pencil-like member 32. Member 32 is formed of a material of the type capable of rotating the plane of polarization of electromagnetic energy propagating therethrough in response to a longitudinally directed magnetic field component. Materials possessing such a property are commonly referred to as Faraday-effect materials and the effect produced thereby is termed Faraday rotation.

Such material can comprise magnetic material of the type commonly referred to as gyromagnetic material which is characterized by constituent atoms which are capable of exhibiting susbtantial precessional motion at frequencies within the microwave frequency range. The precessional motion, in turn, is thought of as having an angular momentum, a gyroscopic moment and a magnetic moment. Included in this class of materials are ionized gaseous media, paramagnetic materials and ferromagnetic materials including the spinel ferrites and the garnet-like yittrium-iron compounds. The fabrication of elements of such material is well-known in the art; for example, see United States Patent No. 2,846,655, issued to A. H. Iverson on Aug. 5, 1958.

Member 32 can be supported by polyfoam washers 33 and 34 or by any suitable low-loss dielectric spacers well-known in the art. In order to reduce any mismatch caused by member 32, the ends thereof can be tapered or suitable dielectric matching members known in the art can be employed.

A multiturn solenoid 35 is provided around waveguide section 31 in the transverse region of member 32. An electric current derived from a suitable source such as battery 36 and applied to solenoid 35 provides the required longitudinal magnetic field in member 32 to effect Faraday rotation. The magnitude and direction of the current in solenoid 35, and thus the magnitude and sense of the resulting magnetic field in member 32, can be varied by means of switch 37 and rheostat 38 in series with battery 36.

Disposed at a first end region of waveguide section is a first input port A which, for example, can comprise a section of coaxial transmission line 39 having the inner conductor thereof extending into the interior of waveguide section 31. Input port A is adapted to couple electromagnetic wave energy into waveguide section 31, having an electric vector polarized in the direction indicated by the arrow $E_A$. A second input port B is also disposed at the first end region of waveguide section 31 and is orientd at an angle, preferably equal to substantially 90 degrees, to input port A. Port B can also comprise a section of coaxial line 40, having the inner conductor thereof extending as a probe into guide 31. Port B is therefore adapted to couple to electromagnetic wave energy within waveguide section 31, having only the polarization of the electric vector shown by arrow $E_B$ which, as mentioned, is preferably orthogonal to arrow $E_A$.

Disposed at the opposite end region of waveguide section 31 is an output port O which can also comprise a section of coaxial line 41 having the inner conductor thereof extending inside the waveguide section 31. Port O is advantageously positioned so that it couples wave energy within waveguide section 31, which has an electric vector polarized in a direction midway between the angle formed by vectors $E_A$ and $E_B$. If input ports A and B are disposed at a 90 degree angle to each other as in a preferred arrangement, the output port O is oriented so that it is 45 degrees from both input ports A and B. A fourth port L can also be utilized, primarily for matching purposes. In the embodiment of FIG. 3, port L, also comprising a section of coaxial line 42, is disposed at a 90 degree angle to port O and is terminated by a non-reflective dissipative load impedance $Z_L$.

Figure 4A:
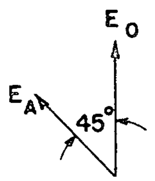
FIGS. 4A, 4B and 4C are vector diagrams illustrating the operation of the embodiment of FIG. 3.
Figure 4B:
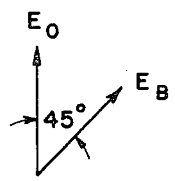
Figure 4C:
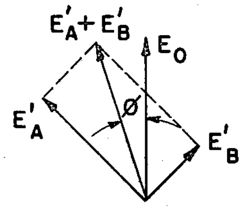

The operation of the multifunction switch of FIG. 3 can now be explained with the aid of the vector diagrams shown in FIGS. 4A, 4B and 4C.

In FIG. 4A the electric field vector of the electromagnetic wave energy introduced into the switch of FIG. 3 through input port A is indicated by vector $E_A$. In order to couple this electromagnetic wave energy out of switch 30 it is apparent that it must be rotated in a clockwise direction through an angle substantially equal to 45 degrees or $\pi/4$ radians. When this is done the direction of the electric field is oriented as shown by the output vector $E_O$. By the same token, an input signal which is introduced at input port B is shown in FIG. 4B as having an electric vector $E_B$. In order that the electromagnetic wave energy be coupled out of switch 30, it must be rotated in a counterclockwise direction through an angle substantially equal to 45 degrees or $\pi/4$.

In the embodiment of FIG. 3 the direction of rotation of the electromagnetic wave energy is determined by the polarity of the direct current biasing current applied to solenoid 35, which, in turn, is determined by the position of switch 37. The magnitude or degree of rotation is determined by the magnitude of this current, which, in turn, is regulated by rheostat 38. Once the current through solenoid 35 is set at the proper value to achieve 45 degree rotation of the electromagnetic wave energy in one direction of rotation (e.g., clockwise, for wave energy applied through input port A), then by merely changing switch 37 to its other position the biasing current is reversed, thereby reversing the direction of rotation of the propagating electromagnetic wave energy. Thus, by merely switching switch 37 from one position to the other, electromagnetic wave energy from either input port A or input port B is effectively coupled out of output port O. In either state, substantially all the wave energy from the uncoupled input port is dissipated in the matched load impedance $Z_L$.

Referring now to FIG. 4C, there is shown the general vector diagram of the electric vector of wave energy simultaneously applied to both input ports A and B. In the general case, the input electromagnetic wave energy to input port A is designated $E_A'$, and has a magnitude somewhat different from that applied to input port B and designated $E_B'$. The vector sum of $E_A'$ and $E_B'$ is also indicated in FIG. 4C. The vector combination of $E_A'$ and $E_B'$ is polarized at an angle $\phi$ degrees removed from the output port angle indicated by vector $E_O$. Therefore, if it is desired to couple the combination of the wave energy from both input ports A and B to output port O, it is only necessary to provide rotation through an angle $\phi$, which is less than 45 degrees.

In many instances the magnitude of the electromagnetic wave energy applied to input port A will be substantially equal to that applied to input port B. When such is the case, the vector sum $E_A'+E_B'$ will form an angle $\phi$ of zero degrees and no rotation is required. In this case, the biasing current through solenoid 35 can be decreased to zero, such as by placing switch 37 in a neutral or off position.

As mentioned hereinabove in connection with the embodiment of FIG. 1, a plurality of multifunction switches can be employed in an environment which is inaccessible to manual control. In such an environment, switch 37 can be replaced by a remotely activated relay or switch arrangement. Similarly, rheostat 38 can be replaced by a resistor having fixed taps, with a second switching arrangement for selecting the tap appropriate to produce the desired biasing current magnitude and corresponding degree of rotation.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A microwave circuit having an input port and an output port, said circuit comprising, in combination:
a plurality of microwave devices, each having an input and output port;
means for selectively coupling a predetermined number of said devices to said circuit between said circuit input and output ports, said means including;
power dividing means adapted to couple said circuit input port to said input ports of each of said devices;
a plurality of multifunction microwave switches, each having at least two input ports and an output port, each of said switches being capable of coupling either or both of its input ports to its output port simultaneously, depending upon its state;
means for selectively altering the state of each of said switches;
means for coupling said output port of each of said microwave devices to a separate input port of one of said switches respectively; and
means for coupling the output ports of said switches to said circuit output port.

2. The microwave circuit according to claim 1, wherein each of said multifunction microwave switches comprises:
a section of conductively bounded waveguide;
an element of Faraday-effect material longitudinally disposed within said section;
a first and second input port disposed at one end region of said section, each of said input ports being adapted to couple substantially orthogonally polarized microwave energy into said section;
at least one output port disposed at the other end region of said section, said output port being adapted to couple microwave energy polarized at an angle substantially midway between the angle formed by said input ports from said section; and
means for impressing a controllable longitudinal magnetic biasing field on said element.

3. The microwave circuit according to claim 1 wherein each of said devices comprises a microwave amplifier.

4. The microwave circuit according to claim 1 wherein said power dividing means comprises at least one microwave hybrid network.

References Cited

UNITED STATES PATENTS

| | | | |
|---|---|---|---|
| 3,038,131 | 6/1962 | Uebele et al. | 333—7 |
| 2,229,090 | 1/1941 | Kinzer | 333—7 |
| 2,281,035 | 4/1942 | Green | 333—7 X |
| 2,848,714 | 8/1958 | Ring. | |
| 2,994,045 | 7/1961 | Van Uitert | 333—24.3 |
| 3,030,501 | 4/1962 | Rapuano | 333—24 X |

HERMAN KARL SAALBACH, *Primary Examiner.*

PAUL L. GENSLER, *Assistant Examiner.*